Figure 2:
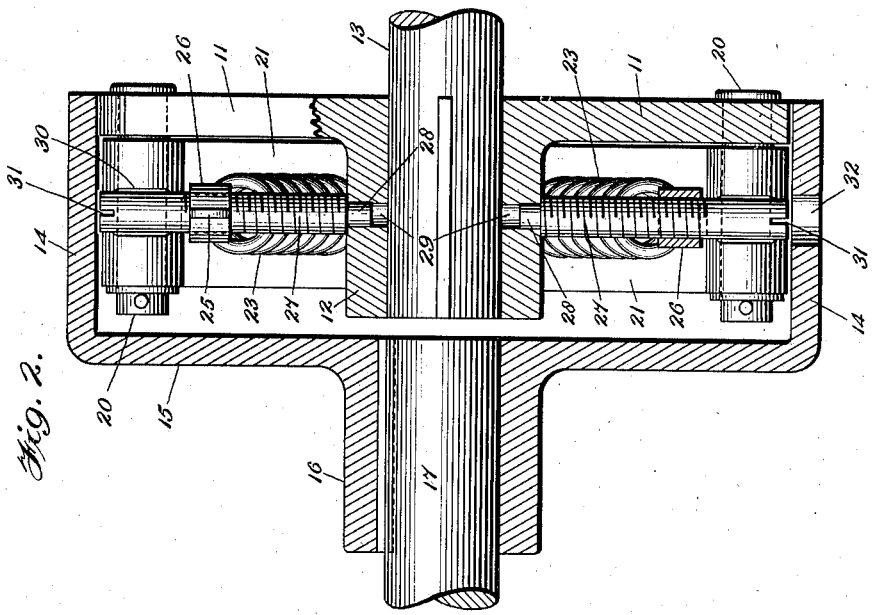

May 31, 1949.  W. HINDEN ET AL  2,471,747
CENTRIFUGALLY OPERABLE CLUTCH
Filed Aug. 1, 1947

Inventors
Werner Hinden and
Hellmut Hinden,
by
Attorney

Patented May 31, 1949

2,471,747

UNITED STATES PATENT OFFICE 2,471,747

CENTRIFUGALLY OPERABLE CLUTCH

Werner Hinden and Hellmut Hinden, Rio de Janeiro, Brazil

Application August 1, 1947, Serial No. 765,562
In Brazil August 6, 1946

2 Claims. (Cl. 192—105)

The invention relates to centrifugally controlled clutches, and has for its principal object the provision of a clutch of this character which will be of comparatively simple and inexpensive construction, and in which adjustments for changing the engaging speed of the clutch and/or varying the transmittable torque, within limits, may be quickly and easily made without opening or in any way dismantling the device.

Figure 1:
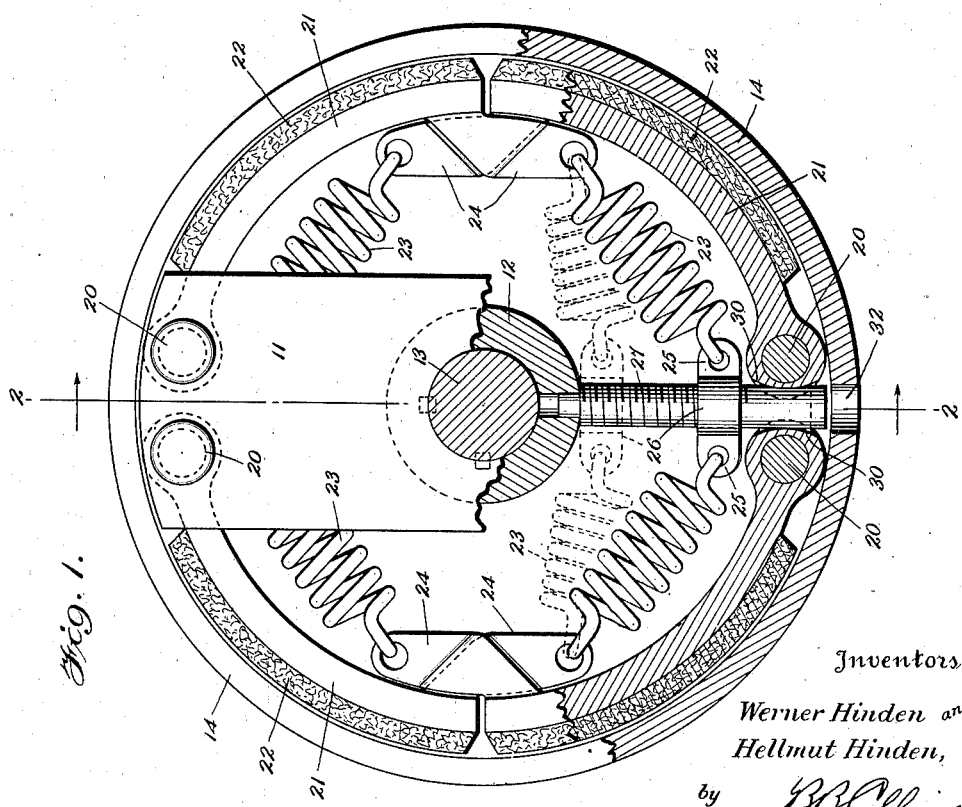

A typical example of a clutch constructed and arranged to secure accomplishment of the above objects is shown in the accompanying drawing forming a part of this specification, in which like reference characters designate like parts in all the views, and in which:

Figure 1 is an end elevational view, partly broken away and in section, of one form of such clutch; and Fig. 2 is a longitudinal sectional view taken approximately on the plane indicated by the line 2—2 of Fig. 1, looking in the direction of the arrows.

As will be readily understood from the said drawing, the clutch comprises a driving member 11, here shown as a rectangular plate-like element, having a hub 12 by means of which it may be mounted upon and keyed to a driving shaft 13. The said driving member is disposed within the annular flange 14 of a driven member 15 which is provided with a hub 16 whereby it may be mounted upon and keyed to a driven shaft 17, axially alined with the drive shaft 13.

At each of its ends the driving member 11 carries a pair of studs 20, upon each of which is journalled one end of an arcuate clutch shoe or element 21, to the outer face of which is secured a suitable clutch facing or lining 22. As will be clear from Fig. 1, these clutch elements are disposed in contiguous circumferential relation within the annular flange 14 of the driven member 15, and they are of such mass as to be sufficiently responsive to centrifugal force when rotated by the driving member 11 to move outwardly about the pivots 20 and bring the facings 22 into torque transmitting engagement with the inner periphery of said flange whereby to cause rotation of the latter. It will also be readily understood from the drawing that the clutch elements are arranged in circumferential pairs, with the adjacent ends of each pair being mounted by the studs 20 in slightly spaced relation.

For retracting the clutch elements to disengage the facings 22 from the driven member, when the driving member 11 is at rest or is rotating at a speed below that at which clutch engagement is desired, coiled tension springs 23 are provided, one for each clutch element. Each spring has one of its ends attached to an ear 24 rigidly carried by the shoe 21 such spring controls, with the other ends of the springs of each said circumferential pair of elements being secured to eyes 25 carried by a nut 26 which is mounted upon a threaded rod or screw 27, of which there is one for each pair of elements. The said rods or screws 27 are disposed radially of the clutch and their inner ends are reduced as at 28 and journalled in apertures 29 formed in the hub 12 of the driving member 11, while the outer portions of the said rods, which are unthreaded, are received between and journalled by the adjacent pivoted ends of the pairs of clutch shoes, as will be clear from Fig. 1. The said shoe ends are recessed as at 30 to accommodate and journal the rods 27; and the outer ends of the latter are provided with means, such as slots or nicks 31, for engagement by a screw-driver or like tool, whereby the rods may be rotated to adjust the nuts 26 inwardly and outwardly thereon. At one point in its circumference the flange 14 of the driven member is provided with an aperture 32 with which the rods or screws may be alined by manual adjustment of the parts, whereby the tool may be engaged with the heads of the rods for adjustment purposes.

When the nuts 26 are in their outermost positions, indicated in full lines in Fig. 1, the tension exerted by the springs 23 tending to disengage the clutch elements from the driven member will be at substantially the maximum obtainable within the limits of the device, and clutch engagement will take place at a higher speed than it will if the tension be relieved somewhat by moving the nuts inwardly toward or to the dotted line position shown in said figure. Such adjustment of the nuts may be readily accomplished by merely alining first one and then the other of the rods 27 with the aperture 32 and rotating the rods in the proper direction by means of a screw-driver or similar tool inserted through said aperture. Thus, the engaging speed of the clutch, and to some extent the torque transmittable thereby, may be easily and quickly varied without dismantling or opening the clutch.

Although four clutch elements and controlling springs therefor have been shown in this illustrative embodiment of the invention, obviously a greater or less number of these elements may be employed, so long as it is such that they may be arranged in pairs.

What is claimed is:

1. In a centrifugal clutch, the combination of a rotatable driving member; a driven member disposed in co-operative relation thereto; a plurality of centrifugally operable clutch elements pivotally mounted on the driving member for torque transmitting engagement with the driven member, each pair of said elements having their pivoted portions disposed adjacent one another and provided with complemental recesses; a threaded rod for each such pair of clutch elements, disposed radially of the clutch and having one end journalled by the driving member and its other end journalled by said complemental recesses in the adjacent pivoted portions of its pair of clutch elements; a nut threaded upon each of said rods; and a retracting spring for each of said clutch elements, having one end attached to such element, the other ends of the springs of each said pair of clutch elements being attached to the nut on the rod associated with that pair.

2. In a centrifugal clutch, the combination of a rotatable driving member having a central hub; a driven member disposed in axial alinement with said driving member and provided with an annular flange encircling the latter; a plurality of arcuate centrifugally operable clutch elements disposed in circumferentially contiguous relation within said annular flange, adjacent ends of each pair of such elements being pivotally mounted on said driving member, whereby the elements may swing to and from torque transmitting engagement with said flange; a threaded rod for each such pair of clutch elements, disposed radially of the clutch and having one end journalled in said hub of the driving member and its other end extending between and journalled by said pivoted ends of its pair of clutch elements; a nut threaded upon each of said rods; and a retracting spring for each of said clutch elements, having one end attached to such element, the other ends of the springs of each pair of elements being attached to the nut associated with such pair; said annular flange of the driven member being provided with an aperture for alinement with said rods, through which an adjusting tool may be engaged with the latter.

WERNER HINDEN.
HELLMUT HINDEN.

REFERENCES CITED

The following references are of record in the file of this patent:

UNITED STATES PATENTS

| Number | Name | Date |
|---|---|---|
| 1,813,623 | Landahl | July 7, 1931 |
| 2,286,461 | Burns | June 16, 1942 |
| 2,423,015 | Goepfrich et al | June 24, 1947 |

FOREIGN PATENTS

| Number | Country | Date |
|---|---|---|
| 585,305 | Germany | Mar. 4, 1932 |